United States Patent [19]

Smith et al.

[11] 4,312,911

[45] Jan. 26, 1982

[54] CHROMIUM OXIDE COATED REFRACTORY FIBERS

[75] Inventors: Russell D. Smith, Grand Island, N.Y.; Richard E. Tressler, Julian, Pa.

[73] Assignee: Kennecott Corporation, Stamford, Conn.

[21] Appl. No.: 105,320

[22] Filed: Dec. 19, 1979

Related U.S. Application Data

[62] Division of Ser. No. 41,033, May 21, 1979.

[51] Int. Cl.$^3$ .............................................. D02G 3/00
[52] U.S. Cl. .................................... 428/224; 428/389; 428/392; 428/701; 428/446
[58] Field of Search ............... 428/224, 375, 289, 389, 428/379, 384, 538, 392, 539, 262, 265, 268

[56] References Cited

U.S. PATENT DOCUMENTS

| | | |
|---|---|---|
| 3,348,994 | 10/1967 | Rees et al. . |
| 3,416,953 | 12/1968 | Gutzeit et al. ............................. 65/36 |
| 3,585,260 | 6/1971 | Holker et al. . |
| 3,725,117 | 4/1973 | Caruso ................................ 428/265 |

FOREIGN PATENT DOCUMENTS

| | | |
|---|---|---|
| 7485 | 2/1980 | European Pat. Off. . |
| 2829413 | 6/1979 | Fed. Rep. of Germany . |
| 2229665 | 12/1974 | France . |
| 969782 | 9/1964 | United Kingdom . |
| 1481133 | 4/1965 | United Kingdom . |
| 1107877 | 3/1968 | United Kingdom . |

*Primary Examiner*—Lorraine T. Kendell
*Attorney, Agent, or Firm*—William H. Holt; Raymond W. Green; Michael L. Dunn

[57] ABSTRACT

A ceramic fiber and a shrink resistant article manufactured therefrom. The fiber comprises at least 80 weight percent of a refractory compound selected from the group consisting of silica, alumina, aluminum silicate, titania, zirconia, zirconium silicate and mixtures thereof and which comprises less than 5 combined weight percent of alkali or alkaline metal oxide or alkali or alkaline metal silicate. The fiber is uniformly coated with from about 0.01 to about 5 weight percent of $Cr_2O_3$.

5 Claims, No Drawings

CHROMIUM OXIDE COATED REFRACTORY FIBERS

This is a division, of copending application Ser. No. 41,033, filed May 21, 1979.

BACKGROUND OF THE INVENTION (a) Field of the Invention

This invention concerns high temperature fibers and shrink resistant articles manufactured therefrom.

(b) History of the Prior Art

In the prior art, amorphous or polycrystalline fibers were manufactured either from molten ceramic materials or from materials which would convert to ceramic materials upon the application of sufficient heat. Examples of such fibers are mineral wool manufactured by blowing fibers from molten slag obtained as a by-product from metal refining, glass wool manufactured by blowing fibers from molten clay, silica and alumina; refined mineral fibers blown from molten iron silicates; ceramic fibers made from molten aluminum silicates; drawn glass fibers manufactured from alkali metal silicates, alkaline earth metal silicates and borosilicates; and spun fibers from inorganic or organic compositions which convert to ceramic fibers upon the application of heat such as solutions of aluminum chlorhydrate.

Of the foregoing fibers, aluminum silicate, silica and alumina-silica fibers are generally considered to have the highest temperature resistance.

Such fibers, however, have disadvantages which have never been completely overcome. In particular, the heat resistance is still not as high as is desired and shrink resistance of fiber articles manufactured from the fibers was not as good as desired.

Numerous approaches have been taken to improve heat resistance and shrink resistance in inorganic fibers at high temperatures. The most common of such approaches has been to incorporate additives into the composition from which the fibers are made. Among such additives, chromium oxide has been used to increase temperature resistance. For example, U.S. Pat. No. 3,007,806 to Hartwig and 3,449,137 to Ekdahl; U.S. Pat. No. 4,125,406 to Sowman and British Patent specification No. 495,654 all disclose that chromium oxide can be incorporated into a fusion containing silica and alumina followed by formation of fibers from the fused material.

While the incorporation of the chromium oxide into the fibers results in fibers having higher temperature resistance and improvement in shrink resistance of the fibers when formed into mats or other fiber articles, the process has serious disadvantages. In particular, oxygen is released by the chromium oxide in the melt which creates corrosion problems and results in the presence of chromium metal which creates an unstable fiber product.

U.S. Pat. No. 3,019,117 to Labino discloses that a mass of glass fibers may be dipped into a saturated solution of a metal nitrate such as chromium, iron, nickel or cobalt nitrates followed by drying the fiber mass and subjecting the fiber mass to sufficient pressure and temperature to fuse the fibers. While the resulting fiber block has reasonably good temperature resistance, the flexibility and shrink resistance at elevated temperatures is not as good as desired. This is believed, in accordance with the present invention, to be due to migration of the solution prior to complete drying which results in non-uniform coating of the fibers. U.S. Pat. No. 2,839,424 to Labino discloses that fibers of an alkali silicate could be treated with an acidic salt such as an aqueous solution of calcium, zinc or barium chloride so that the alkaline metal of the chloride replaces at least a portion of the alkali metal in the fiber followed by heating to drive off water and treating the resulting fibers with a solution such as chromic anhydride to fill the resulting pores in the fiber with chromic oxide upon heating to a sufficient temperature. The resulting fiber is characterized by pockets of chromic oxide and according to the patent, is resistant to temperatures in excess of 2200° F. and, under certain circumstances, when the fibers are completely covered, i.e., encased, with chromic oxide, will resist temperatures of about 3000° C. without deformation. It is to be noted that the process for treating the fibers is complex utilizing at least two liquid treatment steps and numerous drying and heating steps. It is to be further noted that the only specific teachings with respect to a method for obtaining complete coverage of the fiber with chromium oxide is by incorporating the fiber into a refractory brick structure containing between about 6 to about 16 percent of temperature-resistant oxides such as chromium oxide by weight of product. Such a brick structure is not flexible. Additionally, the fibers discussed in U.S. Pat. No. 2,839,424 are fibers of an alkali silicate which is a substance suitable for utilization in accordance with the process of the Labino patent but which is highly undesirable if resistance to humidity and chemical action is to be obtained.

BRIEF DESCRIPTION OF THE INVENTION

In accordance with the invention, there is provided a flexible shrink resistant ceramic fiber article such as a fiber mat comprising ceramic fibers which comprise at least 80 preferably at least 90 and most preferably at least 95 weight percent of a refractory compound selected from the group consisting of silica, alumina, aluminum silicate, titania, titanium silicate, zirconia, zirconium silicate and mixtures thereof and which comprise less than 5 combined weight percent of an alkali or alkaline metal oxide or alkali or alkaline metal silicate, said fibers being uniformly coated with from about 0.01 to about 5 weight percent of $Cr_2O_3$. Alkali metals include lithium, sodium and potassium. Alkaline metals include barium, calcium and magnesium.

The invention also comprises the ceramic fiber uniformly coated with from about 0.01 to about 5 weight percent of $Cr_2O_3$ from which the shrink resistant ceramic fiber article such as a mat is manufactured and the method for uniformly coating a ceramic fiber comprising at least 80, preferably at least 90 and most preferably at least 95 weight percent of a refractory compound selected from the group consisting of silica, alumina, aluminum silicate, titania, zirconia, zirconium silicate and mixtures thereof and which comprises less than 5 combined weight percent of an alkali or alkaline metal oxide or alkali or alkaline metal silicate. The method of the invention comprises contacting the fiber with a solution containing from about 0.1 to about 20 weight percent of chromium ion; raising the pH of the solution to above about 9.5 while the fiber is in contact with the solution to precipitate a chromium oxide hydrate upon the fiber; removing the fiber from the solution; vaporizing remaining free water from the fiber and heating the fiber to from about 200° to about 1200° C. to convert the chromium oxide hydrate to chromium oxide.

Another method contemplated by the invention for uniformly coating the ceramic fibers with $Cr_2O_3$ comprises the above method wherein the pH is not upwardly adjusted but the solution contains urea or another compound which thermally decomposes to produce ammonia or other basic compound. Alternatively, the pH of the chromium ion solution may be adjusted with ammonium hydroxide or other basic compound so that the adjusted pH is slightly less than that required to precipitate the hydrous chromium compound. Upon exposure to heat, water evaporation produces a higher pH solution in which the hydrous chromium compound precipitates.

Another method contemplated in accordance with the invention for uniformly coating a ceramic fiber with from about 0.01 to about 5 weight percent of $Cr_2O_3$ is to spray a solution of chromium ion on the ceramic fiber during the fiberization step and prior to initial cooling to ambient temperature. The temperature at which the solution is applied is sufficient to immediately vaporize the water and form a uniform chromium containing compound on the fiber surface which calcines to form a $Cr_2O_3$ coated ceramic fiber.

DETAILED DESCRIPTION OF THE INVENTION

"Ceramic" means an inorganic compound having a decomposition or softening point above 1100° C. "Ceramic fibers", as used herein, means synthetic inorganic fibers which, both before and after treatment in accordance with the present invention, have a decomposition temperature or softening point greater than 1100° C. and preferably greater than 1500° C. and a continuous maximum operating temperature greater than 1000° C. and preferably greater than 1300° C.

The ceramic fibers with which this invention is concerned, are glass or microcrystalline fibers having diameters of less than 20 microns. Glass fibers are defined herein as fibers having no true crystalline structure; i.e., amorphous fibers, and microcrystalline fibers are defined herein as fibers comprising true crystals which, on the average, have a size of less than one-fourth of the diameter of the fiber.

Examples of inorganic compounds, from which ceramic fibers are made, in accordance with this invention, are silicon dioxide (silica, $SiO_2$), aluminum silicate, aluminum oxide (alumina, $Al_2O_3$), titanium oxide (titania, $TiO_2$), zirconium oxide (zirconia, $ZrO_2$), zirconium silicate, other high temperature oxides and silicates and mixtures and complexes thereof, and lower melting oxides and silicates such as iron oxides, feldspar and bentonite in low percentages; i.e., less than 10 percent, provided that less than 5 combined weight percent alkali and alkaline metal oxides and silicates are used.

The most preferred fiber for use in accordance with the present invention is a fiber which contains from about 40 to 100, preferably from 45 to 65 and most preferably 45 to 55 weight percent aluminum oxide with between 0 and 60 and preferably from 35 to 55 weight percent silica. Other compounds such as magnesia, iron oxide and ceramic oxides and silicates may be used provided that greater than 5 weight percent of combined alkali and alkaline metal oxides and alkali and alkaline metal silicates are not present since these compounds reduce maximum operating temperatures. Also, generally purer materials (e.g. purified silica and alumina) are frequently desirable. The most preferred fiber contains at least 90% of combined $Al_2O_3$ and $SiO_2$ which are usually at least partially combined with each other in the form of mullite.

In accordance with the invention, the fiber is uniformly coated with from about 0.01 to about 5 weight percent and usually 0.1 to 0.8 weight percent of chromium oxide (chromia, $Cr_2O_3$) which both raises heat resistance of the fiber and unexpectedly permits the formation of shrink resistant mats, blankets and other particles to be formed from the fibers.

"Uniformly Coated", as used herein, means that chromium oxide on the coated fibers is uniformly distributed along the length of the fiber in the form of substantially equally spaced particles or crystals without chemically removing portions of the fiber surface.

In accordance with the invention, there are two major methods for accomplishing a uniform coating of $Cr_2O_3$ upon the fiber. The first method comprises precipitating chromium oxide hydrate ($Cr_2O_3.xH_2O$) upon the fibers by means of a change in pH of a chromium ion solution followed by conversion to $Cr_2O_3$ and the second method comprises spraying the fiber at an elevated temperature with an aqueous chromium ion solution to very rapidly vaporize the water, leaving a uniform deposit of $Cr_2O_3$.

In the first method, an aqueous solution containing from about 0.1 to about 7 weight percent of chromium ion is treated with a base to raise its pH to above about 9.5 in the presence of the fiber to be treated thus precipitating chromic oxide hydrate upon the fiber. The chromium ion is provided by any suitable water soluble salt such as chromium nitrate or chromium acetate. The base used to raise the pH may be any suitable base such as ammonium hydroxide or sodium hydroxide or may be a compound which will thermally decompose to a compound which will provide hydroxy ions upon heating of the solution. An example of such a compound is urea which thermally decomposes to form $NH_3$ which in water forms $NH_4OH$.

Alternatively, the pH of the solution may be raised to a level below 9.5, but above about 8 and the solution concentrated by evaporation thus raising the pH to above about 9.5 to precipitate $Cr_2O_3.xH_2O$ upon the fibers.

After precipitation of $Cr_2O_3.xH_2O$ the $Cr_2O_3.xH_2O$ is converted to $Cr_2O_3$ by heating from about 200° C. to about 1200° C. for a sufficient time to remove both free water and water of hydration leaving a uniform chromic oxide coating on the surface of the fiber. The time for conversion is dependent upon the conversion temperature which may be from 0.5 to 2 hours at 200° C. and from 1 minute to one second at 1200° C. depending upon the quantity of free water on the fiber, the initial temperature of the free water, the initial temperature of the fiber and $Cr_2O_3$, the quantity of $Cr_2O_3$, the circulation and transfer of heat and the number of fibers per unit heating area. The time usually is between 2.5 and 35 minutes at about 700° C. depending upon mat thicknesses varying between 0.5 and 5 centimeters and densities varying between 0.06 and 0.13 grams per cc.

In the second method, a chromium ion solution similar to the solution previously described, prior to precipitation of chromium oxide hydrate, is sprayed in the form of very fine droplets or mist upon the fiber; e.g., in droplet or particle diameter of from between molecular size to ten times the diameter of the fiber. The droplets may be initially somewhat larger but become smaller as they approach the fiber due to vaporization. The temperature of the fiber struck by the droplets or mist is generally from the melting temperature of the fiber down to 350° C. and in the case of alumina-silica fibers when the solution is applied at the time of blowing is usually from about 1500° C. to about 1750° C.

The fibers, uniformly coated with $Cr_2O_3$ in accordance with the invention, are characterized in having better heat resistance than uncoated fibers or non-uniformly coated fibers of the same composition and are characterized in that mats and other articles formed from the fibers have better shrink resistance at elevated temperatures than prior art mats or articles formed from uncoated or non-uniformly coated fibers otherwise having the same composition.

As used herein, elevated temperature means above about $0.8T$ where $T$ is the maximum continuous operating temperature in ° C.

It has been further discovered that shrink resistance of articles made from the fibers can be additionally improved by pretreating the fibers at an elevated temperature in addition to coating them with chromium oxide. The heating at an elevated temperature must be for an insufficient time to cause the fibers to become brittle thus making them difficult to handle. Generally the fiber is pretreated at a temperature between about 1150° and about 1350° C. for from 1 to about 10 minutes. The higher pretreating temperatures require the shorter times.

Fiber articles or mats made from fibers of the invention are usually manufactured by compressing and needling the fibers to form a three dimensional structure which may be used as is or cut to a desired final shape.

EXAMPLE 1

A mixture of 48 percent Bayer process alumina and 52 percent high purity silica sand is melted in a furnace. A stream of the molten mixture at about 1850° C. is then passed through an orifice at a rate of about 340 kg. per hour. The molten stream is then first impinged by an air stream at sufficient pressure to turn the stream about 90°. The molten stream then passes through a secondary stream of air which impinges the molten stream at sufficient force and volume to form fibers having a diameter of about 3 microns. About 65 liters per hour of a liquid containing a lubricant is applied to the stream at the primary nozzle to assist needling.

The fibers are then collected on a moving conveyor mesh and compressed and needled to form a 2.5 cm. thick mat having a density of eight pounds per cubic foot (about 0.13 grams per cc). The mat is then heated to oxidize any remaining lubricant.

The resulting mat is then heated to about 1425° C. from ambient temperature over a period of about 12 hours and held at that temperature for 7 and 14 days. The mat is found to have a linear shrinkage of 9.35% after 7 days and 10.44% after 14 days.

EXAMPLE 2

Example 1 is repeated except an aqueous solution, containing about 1.74 weight percent chromium, provided by dissolving chromium acetate and 4 weight percent lubricant, is substituted for the lubricant solution of Example 1. The resulting mat after heating is uniformly coated with $Cr_2O_3$ and when tested is found to have a linear shrinkage of 7.48% after 7 days and 9.04% after 14 days. The mat is found to have a chromium oxide ($Cr_2O_3$) content of 0.47 weight percent.

EXAMPLE 3

Example 2 is repeated except prior to testing, the mat is prefired at about 1200° C. for 5 minutes. The resulting mat retains flexibility and is found to have a linear shrinkage of 4.65% after 7 days and 5.72% after 14 days.

EXAMPLE 4

Example 2 is repeated except about 86 liters per hour of solution is applied to the fiber. The resulting mat is found to have a $Cr_2O_3$ content of about 0.61 weight percent and a linear shrinkage of about 6.61% after 7 days and 8.10% after 14 days at about 1425° C.

EXAMPLE 5

Example 4 is repeated except prior to testing for shrinkage, the mat is prefired at about 1200° C. for 5 minutes. The resulting mat retains flexibility and is found to have a linear shrinkage of about 5.16% after 7 days and about 6.51% and 14 days.

EXAMPLE 6

The process of Example 1 is followed except that the fibers are needled and compressed to form a 2.5 cm thick mat having a density of 6 pounds per cubic foot (about 0.1 grams per cc). The resulting mat is found to have a linear shrinkage of about 6.65% after 9.5 hours at 1425° C.

EXAMPLE 7

The mat of Example 6 is saturated with a chromium acetate solution containing 87 grams of chromium acetate per 1000 ml of water. Prior to treatment, the solution was adjusted to a pH of 9.5. The blanket is allowed to drain and is dried at about 170° C. which results in a uniform precipitate. After heating at 1425° C. for 9.5 hours, the mat is found to have a linear shrinkage of 5.82%.

EXAMPLE 8

Example 7 is repeated except the mat is prefired at 1200° C. for 5 minutes prior to testing. The resulting mat retains flexibility and after heating at 1425° C. for 9.5 hours, the mat is found to have a linear shrinkage of 2.39%.

EXAMPLE 9

Example 6 is repeated except kaolin clay fibers are used instead of the alumina and silica. The resulting fiber mat has a linear shrinkage of 11.61% after heating at 1425° C. for 9.5 hours.

EXAMPLE 10

Example 7 is repeated except kaolin clay fibers are used. The resulting fiber mat has a linear shrinkage of 5.09% after heating at 1425° C. for 9.5 hours.

EXAMPLE 11

Example 8 is repeated except kaolin clay fibers are used. The resulting fiber mat retains flexibility and has a linear shrinkage of 3.79%.

What is claimed is:

1. A shrink resistant ceramic fiber article comprising ceramic fibers consisting essentially of from about 45 to 65 weight percent aluminum oxide and from about 35 to 55 weight percent silica said fibers being uniformly coated with from about 0.01 to about 5 weight percent of $Cr_2O_3$.

2. The article of claim 1 wherein the fibers are microcrystalline fibers and the article is a fiber mat.

3. The mat of claim 2 wherein the fibers are treated by heating them to between about 1150° and about 1350° C. for from about 10 to about 1 minutes.

4. A ceramic fiber which consists essentially of from about 45 to 65 weight percent aluminum oxide and from about 35 to 55 weight percent silica, said fiber being uniformly coated with from about 0.01 to about 5 weight percent of $Cr_2O_3$.

5. The fiber of claim 4 wherein said fiber is a microcrystalline fiber.

* * * * *